(12) United States Patent
Faure et al.

(10) Patent No.: US 7,698,120 B2
(45) Date of Patent: Apr. 13, 2010

(54) METHOD FOR IMPROVING A WORKING MODEL FOR THE MANAGEMENT OF THE MAN-MACHINE INTERACTION

(75) Inventors: David Faure, Palaiseau (FR); Olivier Grisvard, Palaisvieau (FR); Sébastien Praud, Morangis (FR); Célestin Sedogbo, Beynes (FR)

(73) Assignee: Thales (FR)

( * ) Notice: Subject to any disclaimer, the term of this patent is extended or adjusted under 35 U.S.C. 154(b) by 881 days.

(21) Appl. No.: 10/584,224

(22) PCT Filed: Dec. 16, 2004

(86) PCT No.: PCT/EP2004/053527
§ 371 (c)(1),
(2), (4) Date: Jun. 23, 2006

(87) PCT Pub. No.: WO2005/071536
PCT Pub. Date: Aug. 4, 2005

(65) Prior Publication Data
US 2007/0185701 A1    Aug. 9, 2007

(30) Foreign Application Priority Data
Dec. 24, 2003  (FR) .................................. 03 15354

(51) Int. Cl.
G06F 9/455 (2006.01)
(52) U.S. Cl. ........................................................ 703/23
(58) Field of Classification Search .................. 703/21, 703/22, 23; 725/112; 704/257; 715/500, 715/517; 705/7; 709/200; 434/263; 706/12; 345/720; 717/113, 105
See application file for complete search history.

(56) References Cited

U.S. PATENT DOCUMENTS

| 7,603,657 | B2 * | 10/2009 | Gassner et al. ............... 717/113 |
| 2002/0083025 | A1 * | 6/2002 | Robarts et al. ................ 706/12 |
| 2003/0144055 | A1 * | 7/2003 | Guo et al. ..................... 463/35 |

(Continued)

OTHER PUBLICATIONS

Wasserman A I: "Extending State Transition Diagrams for the Specification of Human-Computer Interaction" IEEE Trans. Softw. Eng. (USA), IEEE Transactions on Software Engineering, Aug. 1985, USA, vol. SE-11, No. 8, pp. 699-713, XP001194542; ISSN: 0098-5589.

(Continued)

*Primary Examiner*—Paul L Rodriguez
*Assistant Examiner*—Kandasamy Thangavelu
(74) *Attorney, Agent, or Firm*—Lowe Hauptman Ham & Berner, LLP

(57) ABSTRACT

The method according to the invention is characterized in that on the basis of an existing task model, which may be provided by an expert, it is enhanced with the current state of the user in his task, the events allowing a change of state of the user are described, and the interaction to be performed with the user to manage an event is described for this event occurring during a state of the user. Advantageously, before each interaction procedure, the list of constraints necessary for triggering the interaction is added, and after each interaction procedure, the values that this interaction should provide according to the result of the interaction and which should be presented to the user as feedback are added.

7 Claims, 2 Drawing Sheets

U.S. PATENT DOCUMENTS

Figure 1:
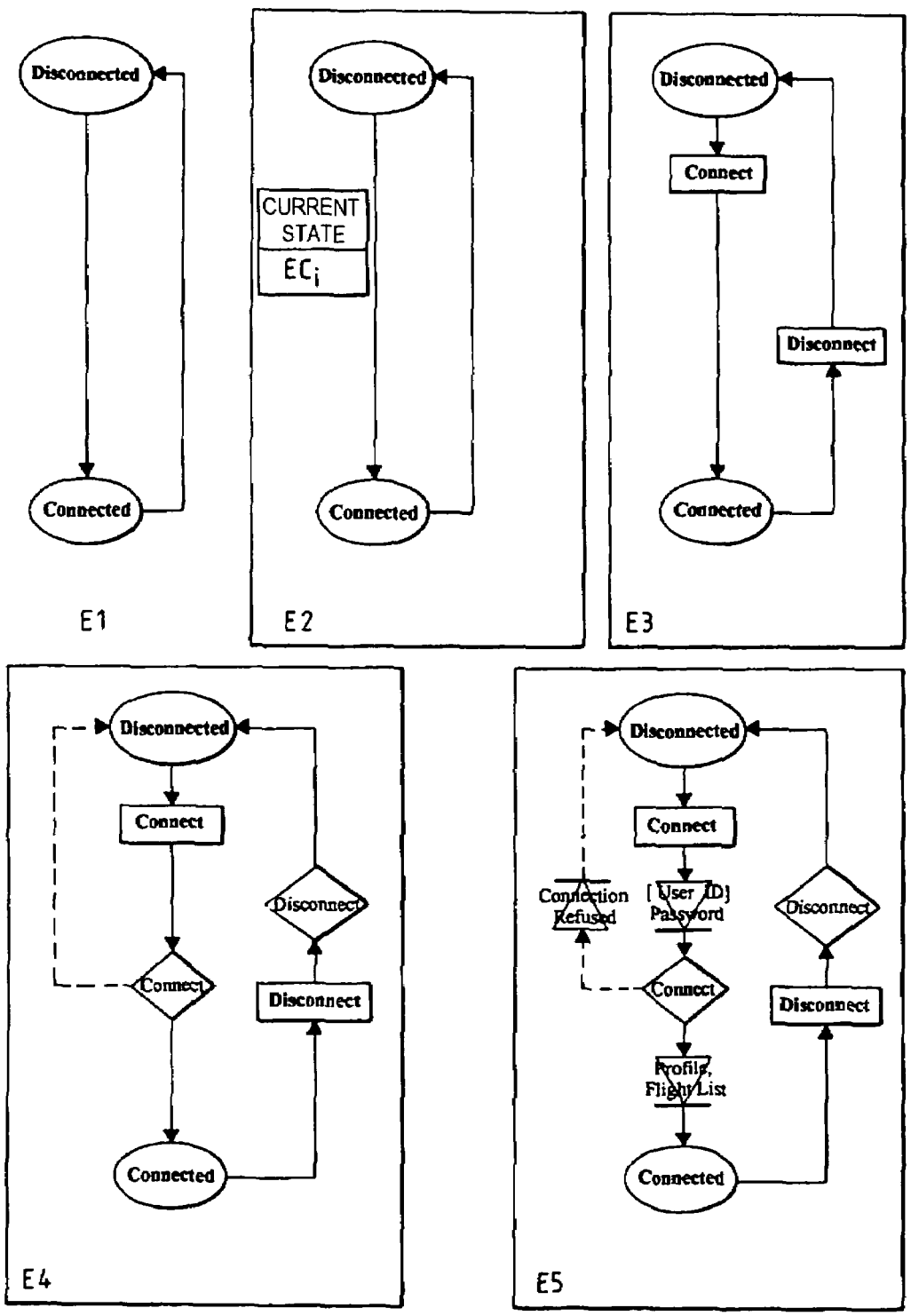

| | | | |
|---|---|---|---|
| 2004/0031058 A1* | 2/2004 | Reisman | 725/112 |
| 2004/0091845 A1* | 5/2004 | Azerad et al. | 434/263 |
| 2004/0128342 A1* | 7/2004 | Maes et al. | 709/200 |
| 2004/0153992 A1* | 8/2004 | Molina-Moreno et al. | 717/105 |
| 2004/0163046 A1* | 8/2004 | Chu et al. | 715/517 |
| 2004/0189691 A1* | 9/2004 | Jojic et al. | 345/720 |
| 2004/0210819 A1* | 10/2004 | Alonso | 715/500 |
| 2005/0004823 A1* | 1/2005 | Hnatio | 705/7 |
| 2006/0089835 A1* | 4/2006 | Bisson et al. | 704/257 |

OTHER PUBLICATIONS

Wasserman A I: "Extending state transition diagrams for the specification of human-computer interaction" Transactions on Software Engineering, Aug. 1985 USA.

Sukaviriya P et al "A second generation user interface design environment: the model and the runtime architecture" 1993 Amsterdam Netherlands Apr. 24, 1993.

Luyten K et al: Derivation of a D1 Model from a Task Model by Activity Extraction Oct. 9, 2003 pp. 203-217 Berlin, Germany.

* cited by examiner

METHOD FOR IMPROVING A WORKING MODEL FOR THE MANAGEMENT OF THE MAN-MACHINE INTERACTION

The present invention pertains to a method of enhancing a task model so as to allow the management of man-machine interaction.

In current systems having an interface with a human, the model of the task of the user is buried within the interface. The task that the user has to perform is not explicitly defined, but is found implicitly in the design of the interface. Interface designers define, according to the specifications, the more or less strict linkups which are permitted to the user. These linkups implicitly define his task model.

This absence of explicit definition of the task model of a user gives rise to considerable staticness of the task of the user. In the case where the mission of the user changes or if the interface has to be deployed for a class of users having a partially different mission, modifications are necessary on the interface. Certain interfaces are designed bearing these modifications in mind which may be considered to be adapted to a different task. This practice imposes a considerable workload when designing an interface that is sufficiently open to allow various configurations. Moreover, configuration of the interface for a new task remains complex in so far as configuration requires the joint work of an expert in the field to specify the new task and of an interface designer. This practice, already relatively expensive, becomes especially difficult to put in place if the task of the user is liable to evolve in the course of a session, this compelling a modification of the application encompassing the task model.

The subject of the present invention is a method of enhancing a task model allowing the real-time management of man-machine interaction without having to modify the application related to this task model, in particular when the task models are made to evolve, the interaction possibly being multi-user.

The method in accordance with the invention is characterized in that on the basis of an existing task model, it is enhanced with the current state of the user in his task, the events allowing a change of state of the user are described, and the interaction to be performed with the user to manage an event is described for this event occurring during a state of the user. Advantageously, before each interaction procedure, the list of constraints necessary for triggering the interaction is added, and, likewise advantageously, after each interaction procedure, the values that this interaction should provide according to the result of the interaction and which should be presented to the user as feedback are added.

Figure 2:
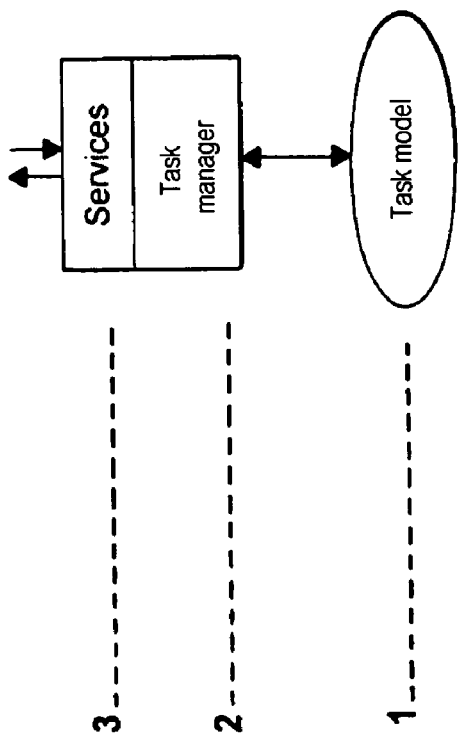
Figure 3:
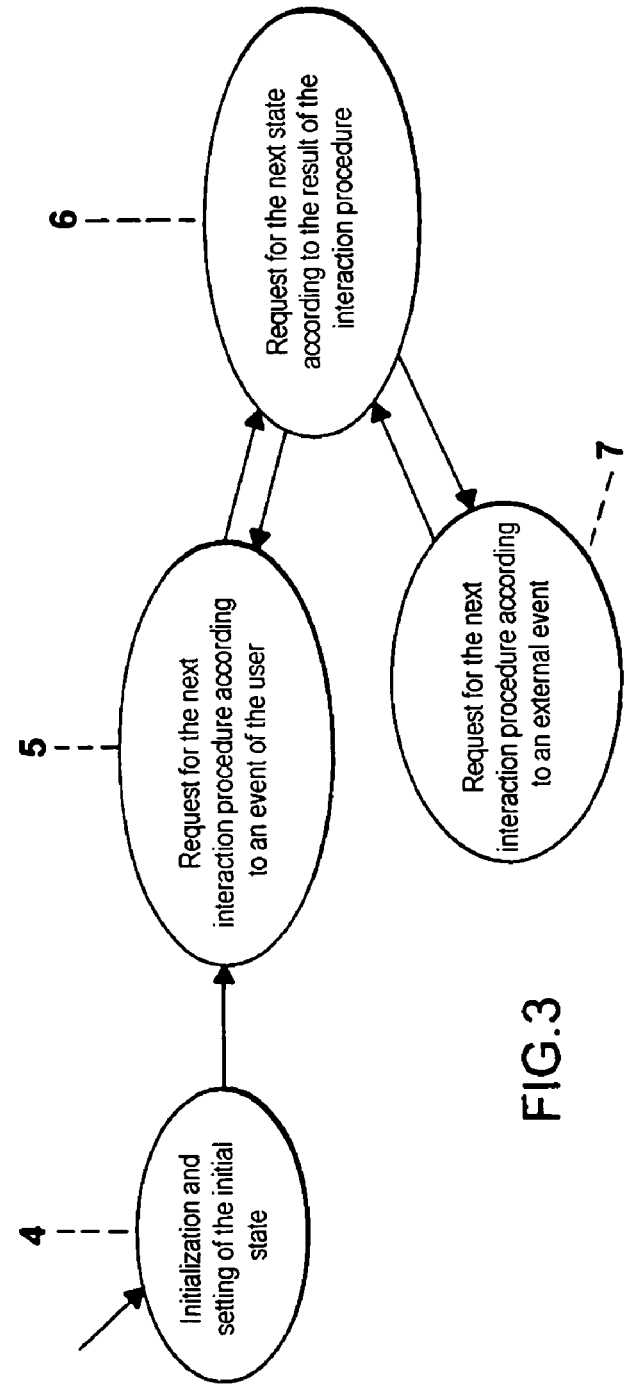

The present invention will be better understood on reading the detailed description of an embodiment, taken by way of nonlimiting example and illustrated by the appended drawing, in which:

FIG. 1 is a simplified diagram explaining various steps of the implementation of the method of the invention in an application, FIG. 2 is a simplified block diagram of the architecture of a task manager in accordance with the invention, and FIG. 3 is a simplified diagram of the conduct of the tasks of the task manager of the invention.

The method of the invention consists essentially in relieving the designers of man-machine interfaces of the issue of the task of the user. Designers will only have to concentrate on the interface functionalities needed by the user without concerning themselves with the linkups that he will have to effect in order to successfully undertake his task.

The invention starts from an existing external task model and enhances it so that it can be used to steer the interaction. Moreover, this model serves interface designers as specification basis for ascertaining the services required by the users.

Finally, this external task model is used by a task manager which is capable of taking into account in real time any change in the task model during the execution of the task.

The invention described here specifies and implements responses to the problems posed by the need to develop and configure interfaces following modifications of the user's task or following a request for deployment directed at other users with a different task. In this sense, this invention has repercussions on all the categories of systems where the human holds a predominant place, doing so in all sorts of fields of application, such as for example:

Defence: weaponry, command, simulation and training systems;
Transport: steering, supervision, booking systems;
Communications: telephony, radio, television, Internet;
Daily life: electrodomestic systems, private vehicles, scattered and ubiquitous domestic computing;
Services: banking systems, electronic commerce, technical assistance;
Health: hospital systems, operational backup;
Etc.

The present invention proposes a new method for enhancing an existing task model so as to allow real-time management of the interaction steered by the task model. Its fundamental principle is to use an existing model of users' tasks and to enhance it with the knowledge necessary for steering the interaction. More precisely, an operator's task model comprises, in addition to the linking up of the tasks to be carried out, the events that may occur, the description of the interactions to be performed, the necessary triggering conditions and the information to be provided as feedback. This enhanced task model makes it possible to steer the interaction in real time by virtue of an additional component, the task manager, which provides the services of access to the task model. The task model in the guise of knowledge external to the interaction is dynamic. Therefore, the task manager permits evolution of the task model over time with real-time repercussion on the interaction with the user.

Customarily, a task model describes the various steps that a user can or must perform in order to successfully undertake his overall task. The user's task must be described in the form of an alternate linkup, sequential or in parallel of subtasks with a particular mention for the initial state. According to the invention, the subtasks performed by the user correspond to as many states which the user is in (in a state such as to perform a subtask).

The first step of the method of the invention starts from an existing task model provided by an expert, and it consists in enhancing this representation with the current state of the user in his task. This additional knowledge makes it possible to track the user in his task.

The second step consists in describing the events allowing a change of state of the user (end of a subtask so as to start another one). These events may be events on the initiative of the user or external events that have occurred in the environment. The environment is defined here as anything except the user: the application or applications, the other users, sensors, etc. This method thus adds, on each transition between two states of the user, the list of one or more events triggering the change of state. The events entered into the task model may be of finer or coarser granularity depending on requirements. According to an advantageous characteristic of the invention, an external module which provides the events is used (it is "used" in the sense of a client using a provider). This module is any man-machine (computer or otherwise) interface whatsoever. It may, for example, be a sensor of weight on a seat which provides a "seated" event. This module provides an abstraction of the actions of the user in the form of high-level events. This abstraction makes it possible to use the same event in the task model regardless of the way in which the user has interacted with the system (vocally, graphically, by gesture, etc.). It is also possible to use low-level events in the task model. The distinction between low-level and high-level events being made here in the sense in which a high-level event is the generalization of one or more low-level events. For example, it may be advantageous, in a task model, to trigger an action on the "Select" (high-level) event, whether this be a selection with a mouse, with a joystick or designation by gesture. On the other hand, it may be advantageous to be able to define three different actions for these three events (low-level). It is possible to use an interface (whatever it may be) which can return a generic event (Select) in certain contexts and specific events in other contexts.

The third step consists in describing, for an event that has occurred during a state of the user, the interaction to be performed with the user to manage this event. The interaction is defined as a procedure to be conducted (interrogation of applications, calculation of a value, verification of a data item, etc.). In fact, the task model may make reference to several different applications. Thus, the user has one and the same interface, and it is then the interaction procedures which are responsible for accessing the necessary applications. Each interaction procedure must provide a result making it possible to decide the next state of the user. For each possible result of the interaction procedure, a transition labelled by the result makes it possible to obtain a new state of the user. For example, in the case where the user is in the "logged off" state and he triggers a "logon" event, the interaction procedure, after having interrogated the application, provides a polar response (yes/no). If the response is positive, the user accesses the "logged on" state, otherwise he remains in the "logged off" state, as described in the enhanced task model.

The fourth step consists in adding, before each interaction procedure, the list of constraints necessary for triggering the interaction. These constraints may be the provision of parameters, the verification of a value, etc. (In the above example, the constraint could be the provision of an identifier and of a password).

The last step consists in adding, after each interaction procedure, the values that this interaction should provide according to the result of the interaction and which should be presented to the user as feedback. (In the above example, the output of the interaction procedure allowing logon could be the "word of the day").

The method of the invention clearly identifies the actions to be performed by the user as well as their sequencing, the events being triggerable or perceived by the user as well as the interactions (in the sense of the task) with the environment.

A task model thus enhanced may take the form of a graph. The formalism used for this graph should offer a power of expression sufficient to express the states (subtasks) of the user, the constraints to be satisfied for the execution of an interaction procedure, the values provided by an interaction procedure, the events that may occur and the manner of taking them into account. It is also necessary for the formalism to allow the representation of task interruption, resumption after interruption, etc.

The real-time management of such a task model is performed by the task manager encapsulating access to the task models. It behaves like a service provider that will be described hereinbelow. The manager is capable of managing several different task models and several users in parallel. The multiplicity of task models managed by one and the same manager allows collaboration between several users having potentially different tasks. The task manager takes into account the way in which a task model evolves over time by offering access services in respect of components which could alter the models.

In order to facilitate the writing and readout of these task models, tools for input and for readout are implemented. These tools allow an expert to be able easily to express or verify the task of one or more users, to specify the various synchronizations in the case of collaborative work and to verify the consistency of the models.

The main advantages of the invention are as follows. Firstly, the present invention consists in enhancing the task model with new knowledge. This enhanced task model makes it possible to steer the man-machine interaction in real time. The designers of the modules managing the interaction with the user no longer have to worry about the way in which the interaction is managed, this information being located within the task model and accessible via the task manager.

The invention also has the advantage of storing in memory the task context of a user and is thus capable of helping to maintain consistency in his mission, be this in the case of voluntary interruption (end of session, etc.) or involuntary interruption (fault involving an interruption or change of workstation, etc.).

Another advantage is the automatic generation of interfaces. If the task model describes the interaction required by the user according to the point of progress of his task, it becomes possible to put in place a system for automatically generating interfaces on the fly. The task model provides the information required in the form of states that can be attained and of events that are triggerable according to the constraints, as a function of the current state of the user.

Another advantage lies in the real-time modification of the task model. The interaction with the user may be modified in real time in the case where external constraints so demand, such as for example a modification of the security levels. The interface of the user may then be modified in real time.

The invention described here, in addition to the advantages cited above, opens the way to new possibilities. Learning by an external module may be cited among these possibilities. This module must receive all the changes of state of the user in real time and must be capable of learning his typical behaviour. The learning may be done in real time or off-line on the basis of a task model (what the user ought to do) of the activity of a user (what he actually does), thereby making it possible to influence his task model in real time. The learning module is then able to alter the task model to simplify the task, to optimize its conduct or to adapt to each user's way of working. The method allows these alterations to be taken into account in real time.

Another advantage is to allow techniques for scheduling the tasks of the user to be put in place readily. This scheduling makes it possible to forecast his actions and to anticipate his requests (anticipatory loading of software modules, anticipated downloading of lengthy data to be obtained, etc.).

According to another characteristic of the invention, the separation between the application and the man-machine interface described in French patent application 02 12012 is applied. The interface is then developed in the form of interaction services according to the specifications of the task model. The interface then no longer comprises the user's buried task model. Before, the interface defined that such and such a window exhibited such data and allowed access to such and such other windows (states). Henceforth, according to the invention, interface developers know which windows to develop by consulting the task model. For each state, one requires a window making it possible to display the information to be presented (diode preceding the state, with reference to FIG. 1, described hereinbelow) and to propose functionalities for triggering the output events (buttons, for example). Thus, the interface developer no longer develops the complete interface, but a list of interface services for the states. For the automatic adaptation of the interface in real time, it is possible to envisage systems where, according to the state at which the user will arrive, knowing the data to be presented to him and the necessary functions (buttons), the best interface service is chosen from a list. There may therefore be three interfaces making it possible to present the list of flights and to access the rest of the task model. The first vocal, the second for a large screen and the third for a PDA (personal assistant). The task manager provides the knowledge defining the requirements in interface terms (present a flight list and the triggerable events), and it is another module which, according to the context of the user, calls such or such an interface service. This characteristic is very advantageous in so far as several interface services may exist in parallel and be chosen according to context. This adaptation allows the user to perform one and the same task on different terminals, with different modalities, etc.

Moreover, the choice of the interaction procedures being defined within the task model, the approach of the development of the interface from the point of view of the services renders it independent of the underlying application. A change of application continuing to offer similar services will involve only an update of the interaction procedures of the task model without alteration necessary on the interface.

In addition to the adaptations above, the development of an interface in the form of services by virtue of the task model makes it possible to vary the task model according to the user without involving any additional development at the interface level.

The enhanced task model also becomes the specification allowing the design and the development of the interfaces and makes it possible to federate the developers of the application with the interface developers. For interface designers, this task model describes the interactions which will be required by the user to perform his task. This model, in the guise of interaction specification, guarantees an interface that meets the needs of the users. Moreover, the task model defines the interaction procedures (generally sets of calls of packaged services) to be triggered during a request of change of state on the part of the user. This allows developers of applications to ascertain the list of services required by the user. This formalism allows interface designers to divorce themselves from all packaged services, since the description of the packaged services to be triggered is specified in the task model.

A possible embodiment of the present invention is the enhancing of the task model of a user. The knowledge provided as input to the method is a task model of a user. This method has allowed the enhancing of the task model in collaboration with experts so as to obtain an extended version, a partial example of which is given hereinbelow.

In order to best manage this task model, an embodiment consists in putting in place a "task manager". The objective of the latter is to provide the services of access to the task for the other software modules that need it. The task model is based, in the present example, on the XML format, easy to appreciate for experts who will have to express it and for the interface designers who will have to use it. The task manager provides access to several different task models for several users, in parallel and in real time.

The task model describes the various states of the user within his task and describes the actions that he can undertake to change state. This formalism defines the starting state of a user who is beginning his task. For each of the states of the user, a certain number of possible actions (potentially just one) may lead him to a new state by triggering an interaction procedure (generally a call to one or more packaged services). The transitions present in this formalism may comprise constraints. The necessity of being furnished with a particular data item to permit the triggering of an action is a form of constraint. The task models of several users may be interrelated in such a way as to be able to take account of the problems of collaborative work.

According to the formalism of the invention, the states of the user are described by ovals, the interaction procedures by diamonds and the parameters required to trigger a procedure by diodes. The information provided by an interaction procedure is also described in the form of diodes and indicates to the interface developers the information resulting from the previous interaction procedure that will have to be presented to the user.

In the case where there exists a hierarchy of classes of users in terms of task where certain users have only a partial task to be carried out as compared with others having the complete task, the task model makes it possible to stipulate the hierarchy of task models so as to facilitate the specialization or generalization of the models.

The task manager of the invention takes the form of an external real-time module providing access to the task models for which it is responsible. It provides all the access services required, such as the initialization of a task model when a new user logs on, the identification of the task model according to the class of the user, the provision of the next interaction procedure as a function of an event, the provision of the next state as a function of the result of an interaction procedure. This module is capable of managing several users in parallel by storing in memory the context of each (the operating process thereof is described with reference to FIG. 3). The security of operation of the task management must be ensured, for example with verification of the actions of the user in relation to his task. The task manager also provides the write-access services to the various task models with saving of the altered models. The task manager can use an external storage module to access the task models of the users.

Represented in FIG. 1 are five main steps of the task enhancement method in accordance with the invention. A solid arrow corresponds to a positive response and a dashed arrow corresponds to a negative response. In this figure, the first step E1 represents the initial task model. Depicted therein in ellipses are two successive states of the user, namely "Disconnected" (logged off, or more precisely, not yet logged on to an apparatus, for example, a microcomputer), and "Connected" (logged on to this apparatus). One speaks of initial state when dealing with the first state in which a user commencing his task is found.

In the next step E2, we add the current state of the user with the aid of a "tag" stored by the task manager. This current state takes the form, for example, of a variable $ec_i$, (i taking the values 1 to n for n possible states of the user).

The method of the invention consists thereafter (step E3) in introducing between these two states the description of an event (depicted in a rectangle), which is here "Connect" (logon request), and which makes it possible to switch the user from the first state to the second. Conversely, the description of another event, "Disconnect", which makes it possible to switch the user from the second to the first state, is introduced.

In the next step E4, we add the interaction procedures each depicted in a diamond. These procedures are the logging on of the user to the machine ("connect") and logging off ("disconnect").

After the "Connect" event description, we introduce (step E5) the parameters governing the triggering of the planned action (depicted by a diode), that is to say the triggering of the process of logging the user onto the machine. In the present case, there are two such parameters, "User ID" (user identity) and "Password" the description of the procedure of interaction with the user, and in the present case, this is simply the "Connect" logon procedure cited above. It will be noted that to switch the user from the second to the first state, there is no need to involve parameters, log off being achieved unconditionally. During this logon procedure, there is, for example, verification of the accuracy of the parameters provided by the user with the help of a keyboard, of an integrated circuit identification card (a so-called "chip card" or "smart card", etc.). The task model describes that the "Connect" procedure must be called upon this change of state. This procedure is external to the task model and only a reference (here its name) allows it to be retrieved. The task manager, following the "Connect" event in the "logged off" state specifies that it is necessary to call the "Connect" procedure. Thereafter, it is up to the module which interrogates the task manager to call this procedure. Thus, the task module has no idea of the content of this procedure. Of course, in the present case good sense would have there be verification of the identification word and of the password of the user. If the parameters thus verified are incorrect, hence refused ("connection refused"), the manager returns the user to the initial state ("logged off", via the dashed path). The manager does nothing other than respond to requests and store the state of the user. It therefore stores that the new state is "logged off" and returns this response to its caller. In the affirmative, the manager sends back the profile provided by the interaction procedure, which profile may for example appear on the said identification card, to trigger the logon action and it stores that the user is henceforth in the logged on state and responds accordingly to its caller. In the present example, these parameters are those of a flight list of a user of an airline company, and the connection is set up with this user profile, which therefore switches to the second state.

The following file segment corresponds to the translation of this scheme into XML form.

```
<state id="disconnected">
    <events>
        <event id="connect">
            <in_param id="userid" type="java.lang.String" />
            <in_param id="password" type="java.lang.String" />
            <interaction_call id="connect" >
                <method id="processing.business.handler.Connect" />
                <next_states>
                    <positive>
                        <out_param        id="flight_list" type="business.FlightList" />
                        <next_state id="connected" />
                    </positive>
                    <negative>
                        <out_param id="connection_refused"
```

-continued

```
type="java.lang.String" />
                        <next_state id=" disconnected" />
                    </negative>
                </next_states>
            </interaction_call>
        </event>
    </events>
</state>
```

Represented in FIG. 2 is the block diagram of the main functions implemented by the method of the invention. As specified hereinabove, the invention starts from an enhanced task model (1) which communicates bidirectionally with the task manager (2). The latter cooperates with services (3) of the application. The task manager provides services to the modules which need them. The diagram of FIG. 3 summarizes the task manager operating process. The process begins with the initialization and the setting of the initial state of the user (4). This step is followed by the request for the next interaction procedure in conjunction with an event due to the user (5). This request talks to the request for the next state of the user as a function of the result of the interaction procedure (6), which for its part talks to the request for the next interaction procedure as a function of an external event (7).

The invention claimed is;

1. A method of enhancing a user task model by an evolutionary learning process for management of man-machine interaction with a computer, comprising the steps of:
   identifying a current state of a user in his task on the basis of an existing user task model implemented on a computer;
   identifying events causing a change of state of the user;
   identifying a user interaction with the computer performed by the user to manage an event occurring during the change of state of the user;
   before each interaction is performed by the user, adding a list of constraints and conditions necessary for triggering the interaction, to the user task model; and
   after each interaction performed by the user, adding outputs that this interaction should provide according to results of the interaction which should be presented to the user as feedback, to the user task model.

2. The method according to claim 1, further comprising providing an abstraction of actions of the user as high-level events using an external module.

3. The method according to claim 1, further comprising modifying the user task model in real time, based on the additions made and generating an enhanced user task model.

4. The method according to claim 3, further comprising modifying the interaction with the user in real time, using the enhanced user task model.

5. The method according to claim 3, further comprising performing learning based upon a user interaction, according to the enhanced user task model using a learning module.

6. The method according to claim 3, further comprising deriving man-machine interface service specifications from the enhanced user task model.

7. The method according to claim 1, wherein an initial task model is provided by an expert.

* * * * *